United States Patent [19]

Ueno et al.

[11] 4,348,507

[45] Sep. 7, 1982

[54] CATALYST COMPONENT FOR USE IN THE POLYMERIZATION OF α-OLEFINS AND A METHOD OF USING THE SAME

[75] Inventors: Hiroshi Ueno, Namekawa; Masafumi Imai; Naomi Inaba, both of Ooi; Makoto Yoda, all of Kawagoi; Shozo Wada, Zushi all of Japan

[73] Assignee: Toa Nenryo Kogyo Kabushiki Kaisha, Tokyo, Japan

[21] Appl. No.: 173,214

[22] Filed: Jul. 28, 1980

Related U.S. Application Data

[62] Division of Ser. No. 29,083, Apr. 11, 1979, Pat. No. 4,242,231.

[30] Foreign Application Priority Data

Apr. 12, 1978 [JP] Japan .................................. 53/42148

[51] Int. Cl.$^3$ .......................... C08F 4/02; C08F 10/06
[52] U.S. Cl. .................................... 526/125; 526/348; 526/351; 526/906
[58] Field of Search ................................ 526/125, 906

[56] References Cited

U.S. PATENT DOCUMENTS

| 4,107,412 | 8/1978 | Welch | 526/125 |
| 4,107,415 | 8/1978 | Giannini et al. | 526/125 |
| 4,242,480 | 12/1980 | Welch | 526/125 |

FOREIGN PATENT DOCUMENTS

| 2644440 | 4/1977 | Fed. Rep. of Germany | 526/125 |
| 1414312 | 11/1975 | United Kingdom | 526/906 |

*Primary Examiner*—Edward J. Smith
*Attorney, Agent, or Firm*—M. B. Kurtzman

[57] ABSTRACT

A supported titanium catalyst is produced by cogrinding, in combination, a magnesium halide, tetravalent titanium halide, organic acid ester, and an organic halogen compound. The resulting supported titanium catalyst, when employed as a titanium component with an organo aluminum catalyst component for the catalyst system in a process for stereoregular polymerization of α-olefins, produces high polymerization activity and unexpectedly high stereoregular polymer yielding ratios.

5 Claims, No Drawings

CATALYST COMPONENT FOR USE IN THE POLYMERIZATION OF α-OLEFINS AND A METHOD OF USING THE SAME

This is a division of application Ser. No. 29,083, filed Apr. 11, 1979, now U.S. Pat. No. 4,242,231.

BACKGROUND OF THE INVENTION

This invention relates to a catalyst component for use in the polymerization of α-olefins and to a process for the polymerization of α-olefins using the same, and more particularly, it is concerned with a supported titanium catalyst component prepared by an improved process and with a process for producing a stereoregular homopolymer or copolymer of α-olefins using a catalyst system comprising the supported titanium catalyst component and an organo aluminum catalyst component.

For the stereoregular polymerization of α-olefins, it has hitherto been carried out to use a catalyst system comprising solid $TiCl_3$, obtained by reducing $TiCl_4$ by various methods, and an organo aluminum compound as cocatalyst. However, this method has many disadvantages on a commercial scale in that both the polymerization activity and stereoregularity of commercially available catalyst systems are low and steps for polymer deashing and for removing amorphous polymers are required. In order to overcome these disadvantages, there have been proposed processes for the polymerization of α-olefins by the use of catalyst systems comprising, by way of example, titanium catalyst components obtained by treating solids, obtained by reducing $TiCl_4$ with organo aluminum compounds, with complexing agents and then with $TiCl_4$ (Japanese Pat. No. 3356/1978) or by treating the solids with complexing agents and hexachloroethane (Japanese Patent Public Disclosure No. 107294/1977). In these examples, as far as solid $TiCl_3$ is used, however, only a part of the titanium can be utilized as active catalyst and, consequently, there is not obtained such a high catalytic efficiency as to omit the deashing step.

As a desirable method for raising the polymerization activity per unit titanium, on the other hand, it has been known to disperse and support titanium compounds on other solids. Actually, in the production of polyethylene by middle or low pressure process, a high catalytic efficiency can be achieved by the use of a catalyst system comprising a titanium catalyst component (titanium compounds on various supports) and an organo aluminum compound component. A polymeric product of good quality can be produced on a commercial scale without polymer deashing step. However, in the polymerization of higher α-olefins, e.g., propylene, a high polymerization activity as well as a high stereoregularity are required, resulting in a more difficult problem than in the case of producing polyethylene by middle or low pressure process.

Of late, various improved methods have been proposed as to the stereoregular polymerization of α-olefins using a catalyst system comprising a supported titanium catalyst component and an organo aluminum catalyst component. For example, there are: (1) a method comprising using a catalyst system composed of a solid supported titanium catalyst component obtained by cogrinding an anhydrous magnesium halide and titanium halide or complex of a titanium halide and an electron donating compound, and an organo aluminum catalyst component consisting of a trialkylaluminum and electron donor (Japanese Patent Public Disclosure Nos. 16986-8/1973); (2) a method comprising using a catalyst system composed of a supported titanium catalyst component obtained in a similar manner to set forth above except in the presence of an organic solid such as durene, hexachlorobenzene or polyolefin and an inorganic solid such as lithium chloride, calcium chloride or alumina, which are substantially inert to the other compounds for composing the catalyst, and an organo aluminum catalyst component consisting of a trialkylaluminum and electron donating compound (Japanese Patent Public Disclosure No. 86482/1974); and (3) a method comprising using, in combination, a supported titanium catalyst component, obtained by contacting a magnesium alkoxide, titanium tetrahalide, electron donating compound and halosilane, and an organo aluminum catalyst component consisting of an organo aluminum compound and electron donating compound (Japanese Patent Public Disclosure No. 98076/1977).

However, the stereoregularity of a polymer produced by the use of such a catalyst system is not always satisfactory and, in particular, when using a molecular weight regulator such as hydrogen, the stereoregularity is markedly lowered. Therefore, the prior art methods are insufficient for fully omitting the step of removing amorphous polymers.

SUMMARY OF THE INVENTION

The present invention provides a process whereby the stereoregularity is mainly improved. That is to say, in accordance with the present invention, there is provided a commercially available process for the polymerization of α-olefins, in which homopolymerization of α-olefins or copolymerization with ethylene or other α-olefins is carried out with an excellent stereoregularity even in the presence of a molecular weight regulator such as hydrogen. The process is achieved by cogrinding and/or using a catalyst system composed of a supported titanium catalyst component, obtained by cogrinding and/or contacting a magnesium halide, preferably, anhydrous magnesium dihalide, tetravalent titanium halide and organic acid ester in the presence of an organo halogen compound, preferably a halogen substituted hydrocarbon, and an organo aluminum catalyst component consisting of an organo aluminum compound and organic acid ester.

DETAILED DESCRIPTION OF THE INVENTION

As the magnesium halide, in particular, anhydrous magnesium dihalide of the present invention, there are ordinarily used $MgCl_2$, $MgBr_2$ and $MgI_2$. Above all, $MgCl_2$ is preferable. These anhydrous magnesium dihalides may be those synthesized by any methods and commercially sold compounds can, of course, be used. It is desirable that the magnesium dihalide is substantially anhydrous and it is not always necessary to be completely anhydrous. Preferably, a commercially sold anhydrous magnesium dihalide, prior to use thereof, is subjected to a dehydration treatment in conventional manner, for example, by firing (calcining, baking) at a temperature of 100° to 400° C. under reduced pressure for 1 to 10 hours, but the presence of water in such an extent that the catalytic performance is not affected is allowed.

Typical examples of tetravalent titanium halides used in the present invention are $TiCl_4$, $TiBr_4$ and $TiI_4$. However, it is not always necessary that all the anions of these titanium halides are halogens, but a part thereof can be substituted by alkoxy, acyloxy or alkyl groups. Of course, TiCl$_4$ is preferred for catalyst components for use in stereoregular (co)polymerization of higher α-olefins, e.g., propylene.

The organic acid esters used in the present invention are esters of saturated or unsaturated aliphatic, alicyclic and aromatic mono- or polycarboxylic acids and aliphatic, alicyclic and araliphatic mono- or polyols. Examples of these esters are butyl formate, ethyl acetate, butyl acetate, ethyl acrylate, ethyl butyrate, isobutyl isobutyrate, methyl methacrylate, diethyl maleate, diethyl tartrate, ethyl hexahydrobenzoate, ethyl benzoate, ethyl p-methoxybenzoate, methyl p-methylbenzoate, ethyl p-tert-butylbenzoate, dibutyl phthalate, diallyl phthalate and ethyl α-naphthoate. The organic acid esters of the present invention are not intended to be limited to these examples. Above all, alkyl esters of aromatic carboxylic acids, in particular, C$_1$ to C$_8$ alkyl esters of benzoic acid or derivatives thereof are preferably used.

Typical examples of the organic halogen compound which may be used in the present invention are halogen-substituted hydrocarbons, i.e., mono- and polyhalo substituted products of saturated or unsaturated aliphatic, alicyclic and aromatic hydrocarbons having 1 to 20 carbon atoms. For example, the aliphatic compounds are methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane and chlorinated paraffins. The alicyclic compounds are chlorocyclopropane, tetrachlorocyclopentane, hexachloropentadiene and hexachlorocyclohexane. The aromatic compounds are chlorobenzene, bromobenzene, o-dichlorobenzene, p-dichlorobenzene, hexachlorobenzene, benzotrichloride and p-chlorobenzotrichloride. The present invention is not intended to be limited thereby. In addition to these halo substituted oxygen-containing compounds, for example, hexachloroacetone, chloroacetic acid esters, trichloroacetic acid esters and the like.

Above all, however, polyhalo substituted hydrocarbons, in particular, polychloro substituted products of aliphatic hydrocarbons having 1 to 4 carbon atoms are preferably used and most preferably, carbon tetrachloride, 1,1,2-trichloroethylene, 1,1,2,2-tetrachloroethane, hexachloroethane and octachloropropane are used. As exemplified hereafter, hexachloroethane has provided the most consistent superior results.

The supported titanium catalyst component of the present invention is obtained by subjecting (a) anhydrous magnesium dihalide, (b) tetravalent titanium halide, (c) organic acid ester and (d) organo halogen compound to a cogrinding and/or contacting treatment by various manners. That is, in the production thereof, the adding methods and contacting orders of these compounds can be suitably varied, but it is required that all of these compounds are finally brought into contact with each other. The cogrinding and/or contacting treatment is preferably carried out as to the following systems each consisting of a combination of these compounds and, particularly preferably, is carried out by mechanical grinding using a vibrating mill, ball mill, etc:

(i) mixtures of (a), (b), (c) and (d);
(ii) mixtures of (b), (d) and a complex (e) formed previously from (a) and (c);
(iii) mixtures of (a), (d) and a complex (f) formed previously from (b) and (c);
(iv) mixtures of (b), (c) and a complex (g) formed previously from (a) and (d);
(v) mixtures of (f) and (g);
(vi) mixtures of (e), (f) and (d);
(vii) mixtures of (a), (f) and (d); and
(viii) mixtures of (d) and a complex (h) formed previously from (a) and (f).

Above all, a method for forming previously a complex is preferably selected from wet process or dry process mechanical grinding treatments and contacting treatments in the presence or absence of a solvent at room temperature or with heating, and each of the mixtures can be prepared by mixing the components at a time or in order.

In the present invention, it is necessary to effect grinding until there is produced a change of intensity in the peaks of 14.8° (strong) and 30.2° (middle) of the characteristic peaks (2θ) in the X-ray diffraction (45 KV×45 mA, CuK$_α$ source, Ni filter) of anhydrous magnesium chloride used as a support, although the mechanical grinding efficiency depends on the grinding system, the structure of a grinding apparatus, the quantity of starting materials charged, voids, temperature, etc. More preferably, the grinding is carried out in such an extent that the peak of 14.8° becomes dull with an increased width and the other peak of 30.2° loses its intensity to a great extent. In the case of charging 10 to 50 g of a mixture in a vibration mill of 300 ml in inner volume, having 100 steel balls of 10 m/m in diameter, and grinding at a vibration width of 1 to 3 m/m and a vibration number of 1400 vpm, for example, the grinding time is usually 1 to 200 hours, preferably 10 to 100 hours.

The quantity of a titanium halide on a support is preferably 0.1 to 10% by weight as titanium metal. An organic acid ester is preferably used in a proportion of 0.1 to 10 mols, particularly, 0.5 to 5 mols to 1 gram atom of the supported titanium metal and an organo halogen compound is preferably used in a proportion of 1 to 100% by weight, particularly, 5 to 50% by weight to the anhydrous magnesium halide.

It is surprisingly found that according to the above-described method, a complex composed of (a), (b), (c) and (d) can be obtained in a flowable solid form even if an organo halogen compound used is liquid.

The supported titanium catalyst component obtained in this way has a substantially similar surface area and pore volume to one prepared in the absence of an organo halogen compound. However, when using the supported titanium catalyst component of the present invention in combination with an organo aluminum catalyst component, it is capable of imparting a high stereoregularity with keeping a high polymerization activity in the homopolymerization of α-olefins or copolymerization with ethylene or other α-olefins.

As an organo aluminum compound for the abovedescribed organo aluminum catalyst component there is used ordinarily an organo aluminum compound represented by the general formula $R_mAlX_{3-m}$, wherein R represents an alkyl group or aryl group having 1 to 18 carbon atoms, X represents a halogen anion and m represents a suitable numeral within a range of $2 < m \leqq 3$, or a mixture or a complex compound thereof. For example, trialkylaluminums are used. There are preferably used as an organo aluminum compound to be used jointly with the trialkylaluminums, alkylaluminum compounds having 1 to 18 carbon atoms, in particular, 2 to 6 carbon atoms, such as dialkylaluminum monohalides, monoalkylaluminum dihalides and alkylaluminum sesquichlorides, or mixtures or complex compounds thereof. Examples of preferred trialkylaluminums are trimethylaluminum, triethylaluminum, tripropylaluminum and triisobutylaluminum. Examples of preferred dialkylaluminum monohalides are dimethylaluminum chloride, diethylaluminum chloride, diethylaluminum bromide, diethylaluminum iodide and diisobutylaluminum chloride. Examples of preferred monoalkylaluminum dihalides are methylaluminum dichloride, ethylaluminum dichloride, ethylaluminum dibromide, ethylaluminum diiodide and butylaluminum dichloride. An example of a preferred alkylaluminum sesquihalide is ethylaluminum sesquichloride. In particular, it is preferable to use triethylaluminum, triisobutylaluminum and as one to be used jointly with them, diethylaluminum chloride and ethylaluminum sesquichloride, or mixtures or complex compounds thereof, because these compounds are readily obtainable commercially and exhibit excellent effects.

When the above-described organo aluminum compound only is used with the supported titanium catalyst component for the polymerization of α-olefins in the presence of a molecular weight regulator such as hydrogen, however, the yield of a stereoregular polymer is remarkably decreased. This is disadvantageous commercially. Therefore, the above-described organo aluminum compound and an organic acid ester, in combination, are preferably used as the organo aluminum catalyst component of the present invention. A suitable organic acid ester may be same as or different from used for the preparation of the supported titanium catalyst component described above and their ratio is chosen within a range of 0.1 to 10 gram atoms, preferably 1 to 5 gram atoms of aluminum in the organo aluminum compound to 1 mol of the organic acid ester.

Preparation of such an organo aluminum catalyst component is carried out by contacting an organo aluminum compound and organic acid ester, for example, by merely mixing them at room temperature or while using a suitable hydrocarbon, such as n-hexane or n-heptane, as a diluent. The organo aluminum catalyst component is ordinarily prepared before a polymerization reaction, but, in general, it is preferably used within 1 hour after the component is prepared since the stereoregularity is unfavorable affected if it is used after storage of the complex for a long time.

The catalyst system of the present invention can be used for the polymerization of α-olefins, in particular, for the stereospecific polymerization of α-olefins having 3 to 6 carbon atoms, for example, propylene, butene-1, 4-methylpentene-1 and hexene-1 and for the copolymerization of α-olefins with each other and/or with ethylene. This copolymerization includes random copolymerization and block copolymerization. In the case of using ethylene as a comonomer, its proportion is generally chosen within a range of up to 30% by weight, in particular, 1 to 15% by weight to α-olefins. A polymerization reaction using the catalyst system of the present invention is carried out under ordinary conventional polymerization conditions. The reaction is carried out in any of a gaseous phase and liquid phase, and for the reaction of liquid phase, any of inert hydrocarbons and liquid monomers can be used. A suitable solvent for the polymerization is selected from the foregoing hydrocarbons. The polymerization temperature is generally −80° C. to 150° C., preferably 40° to 100° C. The pressure ranges, for example, 1 to 40 atm. Control of the molecular weight during polymerization is carried out in conventional manner using hydrogen or another known molecular weight regulator.

The polymerization can be carried out continuously or batchwise. The organo aluminum catalyst component is, of course, utilized for the polymerization reaction and further serves to catch various catalyst poisons introduced into the system. Thus, it is necessary to control the additive quantity of the organo aluminum catalyst component considering the quantities of catalyst poisons contained in α-olefins, solvents or various gases, in particular, when using a high activity catalyst as in the present invention, and, ordinarily, the organo aluminum catalyst component is used so as to satisfy an Al/Ti atomic ratio of 1 to 2000, preferably 50 to 1000, based on titanium in the supported titanium catalyst component.

When polymerization is carried out according to the process of the present invention, the stereo-regularity can largely be improved while holding a high polymerization activity and, consequently, the steps of removing the catalyst (deashing) and removing atactic polymers become unnecessary or the load thereon is markedly reduced. The process of the present invention is particularly important for the production of isotactic polypropylene, random copolymers of ethylene and propylene and block copolymers of propylene and ethylene.

The present invention will now be illustrated in detail by the following examples. However, the present invention is not intended to be limited thereby without departing from the spirit of the present invention. In these examples, percents are to be taken as those by weight unless otherwise indicated. The polymerization activity or catalyst efficiency (which will hereinafter be referred to as "C.E.") is the quantity (g) of a polymer formed per 1 g of titanium in the catalyst. The heptane-insoluble component (which will hereinafter be referred to as "H.I.") to show the proportion of a crystalline polymer in the polymers means the residual quantity (% by weight) in the case of extracting the polymer product with boiling n-heptane for 6 hours by means of a Soxhlet extractor of an improved type. The melt flow rate (which will hereinafter be referred to as "M.F.R.") is measured according to ASTM-D 1238.

EXAMPLE 1

Preparation of Titanium Catalyst Component 28.7 g (64%) of anhydrous magnesium chloride, 7.7 g (17%) of an equimolar complex of titanium tetrachloride and ethyl benzoate (which will hereinafter be referred to as "E.B."), i.e., $TiCl_4 \cdot C_6H_5CO_2C_2H_5$, and 8.5 g (19%) of hexachloroethane were charged in a stainless steel (SUS 32) mill pot with an inner volume of 300 ml carrying 100 stainless steel (SUS 32) balls with a diameter of 10 mm in a nitrogen atmosphere, which was then fitted to a shaker, followed by shaking for 20 hours to contact them. The thus obtained titanium-containing solid was yellow and had a composition of 16.3% Mg, 74.7% Cl, 6.8% E.B. and 2.2% Ti. The surface area of the solid measured by the BET method was 5.2 m²/g and the pore volume was 0.016 cc/g. The results of X-ray diffration (45 KV×45 mA, CuK$_\alpha$ source, Ni filter) of the solid showed that the peaks of 14.8° and 34.8° of the characteristic peaks of anhydrous magnesium chloride became dull with an increased width, the peaks of 30.2° and 63° disappeared and the peak of 50.3° was not changed.

EXAMPLE 1

Polymerization (A)

35.1 mg of the above-described titanium catalyst component (Ti support ratio: 2.2%) was charged in a stainless steel (SUS 32) autoclave with an inner volume of 1000 ml, equipped with a stirrer, in a nitrogen atmosphere. Then, a solution of 1 mol/l of triethylaluminum in n-heptane corresponding to an Al/Ti molar ratio of 300 and E.B. corresponding to an Al/E.B. molar ratio of 3.4 were previously mixed, held for 3 minutes and added thereto. Furthermore, 0.6 l of hydrogen gas as a molecular weight regulator and 0.8 l of liquid propylene were forceably introduced under pressure and the system was heated at 68° C. to effect polymerization for 30 minutes. After the polymerization, the unreacted propylene was purged and 94 g of a white powdered polypropylene was obtained. The results of catalyst performance, pressured per above, were: a C.E. of PP 123,000 g/g-Ti; H.I.=90.1%; M.F.R.=2.5.

EXAMPLE 1

Polymerization (B)

A second polymerization was carried out in an analogous manner to Polymerization (A) of Example 1 except 46.5 mg of the titanium catalyst component was used and triisobutylaluminum was used in place of the triethylaluminum, thus obtaining 116.3 g of polypropylene having a H.I. of 89.6%. C.E. was PP 114,000 g/g-Ti.

COMPARATIVE EXAMPLE 1

The procedure of Example 1 was repeated except using 40.3 g of anhydrous magnesium chloride, 11.1 g of the complex TiCl$_4$.C$_6$H$_5$CO$_2$C$_2$H$_5$ and no hexachloroethane. The thus resulting titanium-containing solid was yellow and had a composition of 20.5% Mg, 68.2% Cl, 8.4% E.B. and 2.9% Ti. The specific surface area of the solid measured by the BET method was 10.8 m²/g and the pore volume was 0.032. The results of X-ray diffraction showed that the peaks of 14.8° (strong) and 50.3° of the characteristic peaks of anhydrous magnesium chloride became dull with an increased width and the peaks of 30.2° (middle), 34.8° (weak) and 63° (weak) disappeared. The different point from Example 1 consists in that the peak of 34.8° disappeared.

COMPARATIVE EXAMPLE 1

Polymerization (A)

Polymerization was carried out in an analogous manner to Example 1, Polymerization (A), except using 36.1 mg of the above-described titanium catalyst component, thus obtaining 121 g of powdered polypropylene. Polymerization results were a C.E. of PP 115,000 g/g-Ti and a H.I. of 86.5%.

COMPARATIVE EXAMPLE 1

Polymerization (B)

Polymerization was carried out in an analogous manner to Example 1, Polymerization (B), except using 33.5 mg of the above-described titanium catalyst component, thus obtaining 91.4 g of polypropylene. Polymerization results were a C.E. of PP 94,000 g/g-Ti and a H.I. of 86.0%.

EXAMPLE 2

23.7 g (60.8%) of anhydrous magnesium chloride, 8.3 g (21.3%) of the complex TiCl$_4$.C$_6$H$_5$CO$_2$C$_2$H$_5$ and 7.0 g (17.9%) of hexachloroethane were charged in the same vibration mill as used in Example 1 and ground for 44 hours to obtain a yellow solid having a Ti content of 2.5%.

EXAMPLE 2

Polymerization

Polymerization was carried out in an analogous manner to Example 1, Polymerization (B), except using the above-described titanium catalyst component, thus obtaining polypropylene polymerization results of a C.E. of PP 157,000 g/g-Ti and a H.I. of 91.2%. In comparison with Comparative Example 1, both of C.E. and H.I., in particular, the latter is markedly improved.

EXAMPLE 3

The procedure of Example 2 was repeated except 22.2 g (62.0%) of anhydrous magnesium chloride, and 8.3 g (23.2%) of the complex TiCl$_4$.C$_6$H$_5$CO$_2$C$_2$H$_5$ were used and 5.3 g (14.8%) of carbon tetrachloride was used in place of hexachloroethane, thus obtaining a yellow green solid containing 2.7% of Ti.

EXAMPLE 3

Polymerization

Polymerization was carried out in a similar manner to Example 1, Polymerization (B), except using the above-described titanium catalyst component. C.E.=PP 73,300 g/g-Ti, H.I.=90.2%.

EXAMPLE 4

The procedure of Example 3 was repeated except 1,1,2-trichloroethylene was added in place of the carbon tetrachloride, thus obtaining a yellow green solid containing 3.6% of Ti.

EXAMPLE 4

Polymerization

A polymerization test was carried out in an analogous manner to Example 1, Polymerization (B), except using the above-described titanium catalyst component. C.E.=PP 81,900 g/g-Ti, H.I.=93.7%.

EXAMPLE 5

The procedure of Example 3 was repeated except p-chlorobenzotrichloride was added instead of the carbon tetrachloride, thus obtaining a green solid containing 3.0% of Ti.

EXAMPLE 5

Polymerization

Polymerization was carried out in an analogous manner to Example 1, Polymerization (B), except using the above-described titanium catalyst component. C.E.=PP 43,700 g/g-Ti and H.I.=88.0%.

EXAMPLE 6

The procedure of Example 2 was repeated except 13.4 g (56.1%) of anhydrous magnesium chloride and 4.1 g (17.2%) of the complex $TiCl_4 \cdot C_6H_5CO_2C_2H_5$ were used and 6.4 g (26.8%) of hexachlorobenzene was used in place of hexachloroethane, thus obtaining a yellow solid containing 2.4% of Ti.

EXAMPLE 6

Polymerization

Polymerization was carried out in an analogous manner to Example 1, Polymerization (B), except using the above-described titanium catalyst component. The results obtained were: a C.E. of 98,000 g PP/g-Ti; and a H.I. of 87.8%.

EXAMPLE 7

The procedure of Example 1 was repeated except an equimolar complex of titanium tetrachloride and ethyl p-methoxybenzoate was used in place of the equimolar complex of titanium tetrachloride and ethyl benzoate, thus obtaining a yellow solid containing 2.3% of Ti.

EXAMPLE 7

Polymerization

Polymerization was carried out in an analogous manner to Example 1, Polymerization (B), except using the above-described titanium catalyst component. The results obtained were: a C.E. of 103,000 g PP/g-Ti; and a H.I. of 91.1%.

EXAMPLE 8

The procedure of Example 2 was repeated except an equimolar complex of titanium tetrachloride and isobutyl isobutyrate was used in place of the equimolar complex of titanium tetrachloride and ethyl benzoate, thus obtaining a yellow solid containing 2.5% of Ti.

EXAMPLE 8

Polymerization

Polymerization was carried out in an analogous manner to Example 1, Polymerization (B), except using the above-described titanium catalyst component, thus obtaining results of a C.E. of 83,000 g PP/g-Ti and a H.I. of 89.5%.

EXAMPLE 9

The procedure of Example 2 was repeated except the contacting or grinding method was varied as follows: Firstly, the anhydrous magnesium chloride and ethyl benzoate only were charged in a vibration mill and previously coground for 3 hours. Then, the hexachloroethane and titanium tetrachloride were simultaneously added, followed by further cogrinding for 42 hours, thus obtaining a yellow solid having a titanium content of 2.1%.

EXAMPLE 9

Polymerization

Polymerization was carried out in an analogous manner to Example 1, Polymerization (B), except using the above-described titanium catalyst component, thus obtaining polymerization results of a C.E. of 98,000 g PP/g-Ti and a H.I. of 89.6%.

EXAMPLE 10

The procedure of Example 2 was repeated except the contacting or grinding method was varied as follows: Firstly, the anhydrous magnesium chloride and hexachloroethane were charged in a vibration mill and previously coground for 3 hours. Then a previously prepared equimolar complex of titanium tetrachloride and ethyl benzoate was further added, followed by cogrinding for 42 hours, thus obtaining a yellow solid having a titanium content of 2.2%.

EXAMPLE 10

Polymerization

Polymerization was carried out in an analogous manner to Example 1, Polymerization (B), except using the above-described titanium catalyst component, thus obtaining polymerization results of a C.E. of 115,000 g PP/g-Ti and a H.I. of 90.7%.

The effects on an organic acid ester in the organo aluminum catalyst component will be shown in the following:

EXAMPLE 11

A polymerization was carried out in a similar manner to the Example 2, Polymerization, except triethylaluminum and ethyl p-anisate were used in place of the triisobutylaluminum and ethyl benzoate as the organo aluminum catalyst component of Example 2. The polymerization results were: C.E.=138,000 g PP/g-Ti; H.I.=90.3%.

EXAMPLE 12

A polymerization was carried out in an analogous manner to the Example 2, Polymerization, except ethyl p-toluate was used in place of the ethyl benzoate as the organic acid ester in the organo aluminum component, thus obtaining polymerization results of a C.E. of 113,000 g PP/g-Ti and a H.I. of 89.8%.

Examples of random copolymers will be given as follows:

EXAMPLE 13

The procedure of Example 1, Polymerization (B), was repeated except 4.5 g of ethylene gas was also added. The copolymerization results were: 185,000 copolymer g/g-Ti; and H.I. 85.2%. The resulting copolymer contained 2.7% of ethylene and an M.F.R. of 2.3.

EXAMPLE 14

A cogrinding treatment was carried out in an analogous manner to Example 2 except carbon tetrabromide was used in place of the hexachloroethane, thus obtaining a canary yellow flowable solid having a Ti content of 3.1%.

EXAMPLE 14

Polymerization

Polymerization was carried out in an analogous manner to Example 1, Polymerization (B), except using the above-described titanium catalyst component, thus obtaining polymerization results of a C.E. of 142,000 g PP/g-Ti and a H.I. of 90.7%.

What we claim is:

1. In a process for the stereoregular polymerization of α-olefins, wherein an α-olefin is contacted, under α-olefin (co)polymerization conditions, with a catalyst system comprising a titanium catalyst component and an organo aluminum catalyst component prepared by mixing an organo aluminum compound and an organic acid ester, the improvement comprising:

the titanium catalyst component being obtained by co-grinding, in combination, a magnesium halide, a tetravalent titanium halide in the amount of from about 0.1 to about 10 percent by weight as supported titanium metal in the resulting titanium-containing solid product, from about 0.1 to about 10 moles per 1 gram atom of supported titanium metal of an organic acid ester and an organohalogen compound in proportion of 1 to 100 percent by weight to the magnesium halide, said organohalogen compound being one of mono- or polyhalo-substituted saturated aliphatic or saturated alicyclic hydrocarbons having from 1 to 20 carbon atoms.

2. The process of claim 1 wherein the halogen-substituted hydrocarbon is a polychloroaliphatic hydrocarbon having from from 1 to 4 carbon atoms.

3. The process of claim 1 wherein the magnesium halide is anhydrous magnesium dichloride, the tetravalent titanium halide is titanium tetrachloride, and the ester is selected from alkyl esters of aliphatic, alicyclic and aromatic carboxylic acids.

4. The process of claim 3 wherein the ester is selected from a $C_1$–$C_8$ alkyl ester of benzoic acid or a derivative thereof.

5. The process of claim 2 wherein the polychloro-substituted hydrocarbon is hexachloroethane.

* * * * *